United States Patent [19]

Kasai et al.

[11] Patent Number: 5,189,107
[45] Date of Patent: Feb. 23, 1993

[54] PROCESS FOR PREPARING POLYMER PARTICLES

[75] Inventors: Kiyoshi Kasai; Fujio Sakurai; Hiroshi Tadenuma, all of Tokyo, Japan

[73] Assignee: Japan Synthetic Rubber Co., Ltd., Tokyo, Japan

[21] Appl. No.: 489,215

[22] Filed: Mar. 6, 1990

[30] Foreign Application Priority Data

Mar. 15, 1989 [JP] Japan ................................. 1-62553

[51] Int. Cl.$^5$ .................. C08F 265/06; C08F 279/02; C08F 2/24
[52] U.S. Cl. ................................. 525/244; 525/178; 525/264; 525/304; 525/902; 525/285; 525/301; 525/308; 525/313
[58] Field of Search ............... 525/244, 264, 304, 902, 525/178, 285, 301, 308, 313

[56] References Cited

U.S. PATENT DOCUMENTS

| | | | |
|---|---|---|---|
| 3,678,133 | 7/1972 | Ryan | 525/80 |
| 4,801,646 | 1/1989 | Henton | 525/902 |
| 4,882,383 | 11/1989 | Ting | 525/902 |
| 4,912,162 | 3/1990 | Kishida et al. | 525/902 |
| 4,972,000 | 11/1990 | Kawashima et al. | 525/902 |

Primary Examiner—James J. Seidleck
Assistant Examiner—Vasu S. Jagannathan
Attorney, Agent, or Firm—Oliff & Berridge

[57] ABSTRACT

Polymer particles prepared by polymerizing polymerizable monomers by seed polymerization, with far more excellent polymerization stability than conventional seed polymerization processes, in the presence of a polymer emulsion comprising low molecular weight polymer particles, radically polymerizable in an aqueous system. The polymer particles are present in an amount of 0.5-30 parts by weight (on solid basis) per 100 parts by weight of polymerizable monomers, have a weight average molecular weight of 500-10,000 and are prepared by emulsion polymerization or soap-free polymerization. The seed polymerization is carried out by initially charging less than 30% by weight of said polymerizable monomers to the polymerization mixture, and after the polymerization conditions are established, by continuously or intermittently adding the remaining portion of said polymerizable monomers to the reaction system.

9 Claims, No Drawings

PROCESS FOR PREPARING POLYMER PARTICLES

BACKGROUND OF THE INVENTION

1. Field of the Invention

This invention relates to a process for preparing polymer particles, and, more particularly, to a process for preparing polymer particles in which seed particles are used for preparing polymer particles by emulsion seed polymerization or soap-free seed polymerization.

2. Description of the Background Art

Synthesis of polymer emulsions in an aqueous system is conventionally performed by emulsion polymerization, soap-free polymerization, or suspension polymerization. In these polymerization methods polymer particles are added to the polymerization reaction system before polymerization is initiated. Such a method is called seed polymerization. Seed polymerization includes multiple stage polymerization in which the seed reaction is carried out successively in the same reaction vessel following the preparation of seed particles. Seed polymerization has an advantage in that the particle size of the seed polymers can be comparatively freely controlled, since the number of particles in the polymerization system can be controlled by the seed. For this reason, this method is widely used.

The amount of seed polymer particles used in seed polymerization is smaller than the amount of the produced polymer particles, and, in many cases, the seed polymer particles are included within the produced polymer particles. For these reasons, the seed polymer particles are not believed to greatly influence the characteristics of the produced polymer particles. At the present time, investigations into seed polymer particles are not sufficient.

Few technological reports have heretofore been published about the influence of seed polymer particles on the molecular weight or on the degree of crosslinking, which are the most important properties of the produced polymers.

Particles produced by emulsion polymerization or soap-free polymerization are commonly used as seeds in conventional seed polymerization. These seed particles usually have a weight average molecular weight in the range of one hundred thousand to several millions and a gel content of several tens of percent to zero percent.

U.S. Pat. No. 4,186,120, Japanese Patent Laid-open Nos. 97582/1979 and 189413/1988 disclose the seed polymerization processes in which low molecular weight seed particles are used. Both processes employ the one-time polymerization method. That is to say, in both processes low molecular weight seed particles are used and monomers are charged at one time. The monomers are then absorbed to seed particles and polymerized.

On the other hand, Japanese Patent Laid-open Nos. 225208/1986, 22509/1981, and 72714/1988 disclose seed polymerization processes in which high crosslinked seed polymer particles are used. Since the crosslinked seed particles used in these processes do not dissolve into monomers and thus do not melt, they are stable and produce less agglomerated substances during polymerization.

Japanese Patent Laid-open No. 107089/1974 and No. 106586 disclose processes for producing composite particles formed of different types of polymers, in which an urethane polymer or an epoxy oligomer is used as seed particles for polymerizing vinyl monomers which are quite different from the urethane polymer or epoxy oligomer. The processes had a drawback of poor polymerization stability due to the great difference between the seed particles and the polymerized polymers.

In view of this situation, the present inventors have undertaken studies in order to achieve a great improvement over conventional processes in the stability during polymerization and to expand the types of monomers, the monomer composition, and the additives which can be used in the polymerization.

There are generally undue restrictions as to the types of monomers, their compositions, the types of stabilizers, and their amounts used for the emulsion polymerization due to its polymerization mechanism. Specifically, polymerization of highly crosslinked monomers, polymerization of monomer compositions having a higher water-solubility, polymerization using a smaller amount of stabilizers, polymerization using large size particles, and polymerization under a high solid component concentration were substantially unfeasible because of poor polymerization stability. Development of a polymerization process free from this drawback and exhibiting high polymerization stability has therefore been desired.

SUMMARY OF THE INVENTION

Accordingly, an object of this invention is to provide a process for preparing polymer particles from polymerizable monomers by seed polymerization in the presence of a polymer emulsion comprising water-insoluble low molecular weight polymer particles, in an amount of 0.5–30 parts by weight per 100 parts by weight of said polymerizable monomers, having a weight average molecular weight of 500–10,000 which are prepared by emulsion polymerization or soap-free polymerization of monomers radically polymerizable in an aqueous medium monomers in the presence of a molecular weight modifier, wherein said seed polymerization of polymerizable monomers is carried out (i) by initially not charging or charging less than 30% by weight of said polymerizable monomers to the polymerization mixture and (ii) after the polymerization conditions, e.g. temperature, atmosphere, stirring, etc. required for the polymerization reaction to start are established, by continuously or intermittently adding the remaining portion of said polymerizable monomers to the reaction system.

Other objects, features and advantages of the invention will hereinafter become more readily apparent from the following description.

DETAILED DESCRIPTION OF THE INVENTION AND PREFERRED EMBODIMENTS

Polymerization stability, which is much more excellent than that obtained by the use of conventional emulsion polymerization processes or seed polymerization processes in which polymer particles having a normal molecular weight are used, can be attained using the process of the present invention.

A feature of the process of the present invention resides in the method wherein the seed polymerization is carried out in the presence of low molecular weight polymer particles having a weight average molecular weight in a specific range (hereinafter referred to as "low molecular weight seed particles"), while continuously or intermittently adding the specified amount of polymerizable monomers.

In conventional seed polymerization processes the reaction is carried out in the presence of seed polymer particles having a normal molecular weight, e.g. 100,000 or more of weight average molecular weight, while adding polymerizable monomers to the reaction system. The molecular weight is, however, too large to attain sufficiently improved polymerization stability.

In the processes disclosed by the aforementioned Japanese Patent Applications, in which lower molecular weight polymers are used as seed polymer particles, almost all monomers are absorbed by the seed polymer particles before the polymerization reaction is substantially initiated. Although these processes have the advantage of controlling the amount of monomers to be absorbed into seed polymer particles, they do not attain the drastic improvement in polymerization stability which is a purpose of the present invention.

The process of the present invention is different from the conventional processes in that a substantial portion of monomer is continuously or intermittently added to the reaction system after the start of the polymerization reaction while the reaction proceeds. That is to say, it is essential in the process of the present invention that 70% or more, preferably 80% or more, and most preferably 100%, of the monomers be added after the polymerization reaction has substantially commenced. The expression "after the polymerization reaction has substantially commenced" in this invention means the point of time at which a polymerization initiator has been added and the conditions, e.g. temperature, atmosphere, stirring, etc., required for the polymerization reaction to start have been established. Specifically, in a case where a common persulfate is used as a polymerization initiator in a seed polymerization process, the "polymerization reaction" is deemed to have "substantially commenced" when the reaction vessel has been replaced by nitrogen, the temperature has been raised to a certain level, and the persulfate has been added.

The molecular weight of low molecular weight particles used in the process of this invention must be 500-10,000, weight average molecular weight, with the preferable range being 700-8,000, and the more preferable range being 1,000-6,000. The weight average molecular weight of a polymer in this invention is the weight average molecular weight determined by a conventional method based on the viscosity measurement of a solution of the polymer or measurement by gel permeation chromatography (converted to polystyrene) and adjusted by viscosity measurement.

The weight average molecular weight of low molecular weight particles of more than 10,000 is nearer to that of seed particles used in the conventional seed polymerization, and thus great improvement purported by the present invention cannot be expected. In addition, the polymerization reaction is difficult to proceed under conditions using a smaller amount of stabilizers, a higher concentration of solid materials, a larger amount of crosslinking monomers, or a larger amount of water-soluble monomers. Polymerization of large sized particles is also difficult.

The composition of low molecular weight seed particles is prepared by the polymerization of radically polymerizable monomers. The composition can dissolve or swell in the monomer to be polymerized. Seed particles prepared from monomers other than radically polymerizable monomers impair the mutual solubility of the seed particles and monomers or the mutual solubility of the seed particles and polymers. This adversely affects the polymerization stability during the polymerization reaction. The desirable composition of the seed particles is the composition of the same or a similar type with that of monomers used in the seed polymerization. Specific examples of the polymer particles which are preferably used are particles of polystyrene, polymetylmethacrylate, poly-n-butylacrylate, styrene-butadiene copolymer, and the like.

There are no specific restrictions as to the size and the size distribution of the low molecular weight seed particles. The particle size and the particle size distribution, however, controls the size and the particle size distribution of the polymer particles produced from the seed particles. For this reason, the preferable way to determine the particle size and the particle size distribution of the low molecular weight seed particles is by using volumetric calculation based on the size of the seed particles and the product polymer particles.

Such low molecular weight seed particles can be prepared, for example, by polymerizing polymerizable monomers by emulsion polymerization or soap-free polymerization in the presence of a comparatively large amount of a molecular weight modifier such as mercaptan. Such a process can produce low molecular weight seed particles having particle sizes of 0.03–3 $\mu$m, and preferably of 0.03–2 $\mu$m.

Low molecular weight polyester emulsions or epoxy resin oligomer emulsions prepared by emulsion dispersion into water of low molecular weight polymers produced by solution polymerization or by bulk polymerization have a broad particle size distribution and have polymer compositions which greatly differ from the compositions of monomers. Such emulsions are not desirable for use in the process of the present invention.

The soap-free polymerization used in this invention is the method of polymerizing radically polymerizable monomers in an aqueous medium using a polymerization initiator such as persulfate or the like in the absence of emulsifiers or in the presence of an emulsifier of a concentration below the critical micelle concentration. The emulsion polymerization used in this invention is the method of polymerizing radically polymerizable monomers by using an emulsifier of a concentration greater than the critical micelle concentration.

Soap-free or emulsion polymerization can be carried out by using seed particles; and such polymerization can be termed seed polymerization.

One or more molecular weight modifiers are used in these polymerization processes. Preferable molecular weight modifiers are n-dodecylmercaptan, t-dodecylmercaptan, n-octylmercaptan, $\alpha$-methylstyrene dimer, and the like. Low molecular weight seed particles used in the process of this invention are water-insoluble. Water-soluble particles are not preferable for use as seed particles for the polymerization.

The amount of the low molecular weight seed particles used in the process is 0.5–30, preferably 1–25, and most L preferably 2–20, parts by weight (converted to solid materials) per 100 parts by weight of polymerizable monomers.

If the amount of the low molecular weight seed particles is smaller than 0.5 parts by weight, the effects of the present invention are not sufficiently exhibited. An amount greater than 30 parts by weight results in an increase in the relative amount of low molecular weight seed polymer components in the product polymer particles, thus impairing product performance such as mechanical strength, heat stability, and the like, even though such a great amount does not cause any particular problems in the polymerization stability.

A portion of polymerizable monomers can be present in the polymerization system before the initiation of the polymerization. A desirable amount, however, is smaller than 30% by weight. An amount smaller than 15% by weight is more preferable. An amount smaller than 5% by weight is still more preferable. Particularly good results are obtained when no polymerizable monomers are present. After the commencement of the polymerization reaction, the monomers are added continuously or intermittently. The rate of addition of the polymerizable monomers should be determined according to the progress of the polymerization reaction, and it is desirable that the rate should be such that the polymerization conversion rate is maintained at about 50% or more at all stages of the polymerization reaction. In the process of the present invention, if necessary, it is possible to change the composition of the monomers to be added either continuously or stepwise during the course of the polymerization reaction. The period of time during which the monomers are added is longer than 30, preferably 60, and most preferably 120 minutes.

There are no specific restrictions as to the types of polymerizable monomers used in the present invention, so long as the monomers are radically polymerizable in an aqueous medium. Specific examples of such monomers are aromatic vinyl compounds such as styrene, α-methylstyrene, p-methylstyrene, chlorostyrene, styrenesulfonic acid, ethylstyrene, divinylbenzene, and the like; aliphatic diene compounds such as 1,3-butadiene, isoprene, 1,4-hexadiene, and the like; ethylenically unsaturated carboxylates such as methylacrylate, methylmethacrylate, butylacrylate, 2-ethylhexylacrylate, glycidylmethacrylate, laurylacrylate, hydroxyethylmethacrylate, N,N-dimethylaminoethylacrylate, and the like; halogen-containing unsaturated compounds such as vinyl chloride, vinylidene chloride, vinyl bromide, and the like; organic acid vinyl compounds such as vinyl acetate, vinyl stearate, and the like; mono- or dicarboxylic acid compounds such as acrylic acid, methacrylic acid, itaconic acid, maleic acid, fumaric acid, and the like, as well as acid anhydrides and monoalkyl esters of these dicarboxylic acids; monoamide compounds such as acrylamide, methacrylamide, and the like; functional group-containing monomers of various kinds such as isoprenesulfonic acid, 2-acrylamide-2-methylpropanesulfonic acid, N-methylolmethacryl amide, and the like.

As polymerization initiators, water-soluble polymerization initiators such as sodium persulfate, potassium persulfate, ammonium persulfate, hydrogen peroxide, and the like and oil-soluble polymerization initiators such as benzoyl peroxide, azobisisobutylnitrile, dilauryl peroxide, and the like can be used. Among these, water-soluble polymerization initiators, especially persulfates, are preferable.

An advantage of the process of the present invention is its outstanding polymerization stability as compared with the conventional seed polymerization processes in which normal seed particles are used and the polymerization is carried out by charging the monomers at one time.

Particles of the size between 0.05-3 μm are usually obtained by the process of the present invention. The preferable range is between 0.1-2.5 μm, with the more preferable range being 0.12-2 μm. The most preferable range is 0.15-1 μm.

The following polymerization systems (I)-(V) are given as the types of the systems by which the process of the present invention can be advantageously applied.

(I) Polymerization system using a small amount of stabilizer

In systems where only a small amount of stabilizer such as surfactants, dispersants, protective colloids, and the like are used, the polymerization stability is necessarily impaired, resulting in an increase in the amount of coagulated materials. In an extreme case, the polymerization system is gelled.

A remarkable improvement in the polymerization stability can be achieved using the process of the present invention. Specifically, even in polymerization systems wherein a surfactant of an amount below 0.1 parts by weight per 100 parts by weight of polymerizable monomers is used or below the critical micelle concentration is used, seed polymerization proceeds while maintaining high stability. In this type of polymerization system, the effects of the present invention are remarkable.

(II) Polymerization system with a high solid component concentration

A solid component concentration of polymer emulsions normally produced by emulsion polymerization is about 40-60% by weight. Products with 50-60% by weight of the solid component concentration can be obtained by the application of special design in the polymerization process or by concentrating emulsion following the polymerization. However, these methods have several drawbacks, e.g. polymer particles produced have larger sizes or broader size distributions, a large amount of emulsifiers are required, etc. Products having a higher solid component concentration, i.e., 55% by weight or more, can be easily produced by the process of the present invention.

(III) Polymerization system using a large amount of crosslinking monomers

The polymerization mechanism of emulsion polymerization and soap-free polymerization is such that a large number of fine particles are produced at the initial stage and these fine particles agglomerate and coalesce to produce a certain number of core particles which are to grow into ultimate polymer particles. Monomers are then absorbed by the core particles and polymerize to produce larger size polymer particles.

If the proportion of crosslinking monomers in the emulsion polymerization monomer compositions is several percent, a great amount of crosslinking formed by the monomers prevents the core particles from coalescing. This decreases the ability of the core particles to absorb monomers, thus preventing the core particles from absorbing monomers and growing into larger particles. This results in the polymerization reaction mixture containing a large number of fine particles having decreased colloid-chemical stability and brings about poor polymerization stability.

The process of the present invention ensures a stable polymerization reaction almost independently from the proportion of crosslinking monomers and produces polymer particles having a size between 0.05-3 μm. In particular, the process can easily produce super crosslinked polymer latexes with an emulsion polymerization particle size between 0.1–1.5 μm, preferably between 0.1–0.5 μm, from monomers containing 10–100% of crosslinking monomers.

The one-time polymerization process, i.e., the polymerization in which all monomers are charged to the reaction system before the commencement of the polymerization reaction, may also produce such super crosslinked polymer latexes by using low molecular weight seed polymer particles. The seed polymerization process of this invention, however, provides far more stable polymerization stability than the one-time polymerization under the polymerization conditions under which acceptable polymer particles heretofore could not be produced. That is to say, the process provides a broader spectrum of applicability.

In the present invention, the proportion of the crosslinking monomers can be 10–100% by weight, preferably 15–100% by weight, and especially preferably 30–100% by weight.

Crosslinking monomers which can be used include non-conjugated divinyl compounds typified by divinylbenzene; compounds having at least two or preferably more of copolymerizable double bonds such as polyvalent acrylate compounds, e.g. trimethylolpropanetrimethacrylate, trimethylolpropanetriacrylate, etc.; and the like. Specific examples of polyvalent acrylate compounds which can be used in the process of the present invention are as follows.

Diacrylate compounds

Polyethyleneglycoldiacrylate, 1,3-butyleneneglycoldiacrylate, 1,6-hexaneglycoldiacrylate, neopentylglycoldiacrylate, polypropyleneglycoldiacrylate, 2,2'-bis(4-acryloxypropyloxyphenyl)propane, 2,2'-bis(4-acryloxydiethoxyphenyl)propane, and the like.

Triacrylate compounds

Trimethylolpropanetriacrylate, trimethylolethanetriacrylate, tetramethylolmethanetriacrylate, and the like.

Tetraacrylate compounds

Tetramethylolmethanetetraacrylate, and the like.

Dimethacrylate compounds

Ethyleneglycoldimethacrylate, diethyleneglycoldimethacrylate, triethyleneglycoldimethacrylate, polyethyleneglycoldimethacrylate, 1,3-butyleneglycoldimethacrylate, 1,4-butyleneglycoldimethacrylate, 1,6-hexaneglycoldimethacrylate, neopentylglycoldimethacrylate, dipropyleneglycoldimethacrylate, polypropyleneglycoldimethacrylate, 2,2'-bis(4-methacryloxydiethoxyphenyl)propane, and the like.

Trimethacrylate compounds

Trimethylolpropanetrimethacrylate, trimethylolethanetrimethacrylate, and the like.

Porous crosslinked polymers can be produced if the polymerization reaction is carried out in the presence of a solvent such as toluene, n-hexane, n-heptane, cyclohexanol, cyclohexane, methyl isobutyl ketone, or the like.

Among the crosslinked polymer particles, those satisfying the following conditions are especially suitable for use for the production of polymer-particle-containing fibers having a superior anisotropic property and effective concave-convex structures on the side of the fibers.

(a) Crosslinked polymer particles produced by the emulsion polymerization of radically polymerizable monomers containing at least 5%, preferably 10%, by weight of crosslinking vinyl monomers.

(b) Crosslinked polymer particles having a volume average particle size of 0.1–3 μm.

(c) Crosslinked polymer particles containing 80% by weight or more of the particles of which the particle size falls within 30% of the volume average particle size.

Here, anisotropy of fibers can be defined as the presence of bulges along the longitudinal direction of the fibers.

When such crosslinked polymer particles are added to synthetic fiber polymers in an amount of 0.01–5 parts by weight per 100 parts by weight of the fiber, a polymer mixture having superior heat resistance which can endure a spinning process can be obtained.

The particle size of such crosslinked polymer particles directed to such an application have a volume average particle size of 0.1–3 μm, and preferably 0.15–2.5 μm. Particles having a diameter less than 0.1 μm are not sufficient for exhibiting anisotropy when being incorporated into fibers and spun. A particle size greater than 3 μm, on the other hand, causes problems such as clogging of spinning nozzles, fiber cutting, and the like. A narrower particle size distribution is thus desirable. For example, it is preferable that at least 80% by weight, preferably 85% by weight, of the crosslinked polymer particles have particle sizes falling within 30% of the volume average particle size.

Furthermore, it is desirable that crosslinked polymer particles to be added to fibers have a softening point of higher than 180° C., preferably 200° C., and most preferably 250° C.

Since the crosslinked polymer particles of the present invention are organic materials, they have greater affinity with fibers than do conventional inorganic particles. Because of this, the particles have the advantage of causing less stripping phenomena in the fiber when the fiber is stretched. This, in turn, makes the fibers less brittle, stronger, and more stretchable.

The porous polymer particles, another embodiment of the product of the present invention, have the advantage of even greater adhesion within the fiber, and bring about even greater effects in the fibers.

A second advantage of the crosslinked polymer particles of the present invention is in their characteristic of being able to exhibit a certain degree of deformation during the spinning operation at a high temperature. This ensures that the particles having a diameter twice as large as the inorganic particles can easily pass through the spinning nozzles.

A third advantage of the crosslinked polymer particles resides in their characteristic of being able to return to their original shape after passing through the nozzles. This characteristic ensures that fibers have a superior anisotropy, i.e., fibers having a great number of concave-convexes on their surface, can be produced. Textiles woven from composite fibers containing these particles exhibit special gloss and have a high commercial value.

There are no specific restrictions as to the fibers into which the crosslinked polymer particles of this invention are incorporated. It is desirable that polymers are those spun at a temperature higher than 150° C., preferably higher than 200° C. Specific examples of fiber polymers to which the polymer particles can be added include Nylon 6, Nylon 66, Nylon 610, Nylon 11, polyethyleneterephthalate, polyacrylonitrile, polypropylene, polyvinyl alcohol, polyvinyl chloride, polyvinylidene chloride, polyurethane, and the like. Among these, especially preferable polymers are Nylon 6, Nylon 66, and polyethyleneterephthalate.

There are no specific limitations to the manner by which these fiber polymers and the crosslinked polymer particles are composed. Dry blending of the crosslinked polymer particles in a powdery form into fiber polymers or latex blending by which the crosslinked polymer particles in a latex form are blended into fiber polymers can be given as examples. The most preferable method of homogeneously dispersing the crosslinked polymer particles in fiber polymers is to synthesize the fiber polymers in the presence of the crosslinked polymer particles.

Conventional melt spinning is applicable for spinning fiber polymers composed of the crosslinked polymer particles. The heating conditions below 450° C.×10 minutes for the melt spinning are preferable from the aspect of the heat resistance of the crosslinked polymer particles, although the spinning temperature can be determined depending on the types of fiber polymers to be used. Solution spinning is also suitably applicable.

The amount of the crosslinked polymer particles to be incorporated into fiber polymers is usually 0.01-5, and preferably 0.1-3, parts by weight per 100 parts by weight of fiber polymers.

Greater anisotropy and concave-convexes in the fiber side can be provided by the use of the fibers containing the crosslinked polymer particles, resulting in excellent glossiness and in a superior feeling to the touch of the textiles made from the fibers. This greatly promotes the commercial value of the products.

(IV) Polymerization system containing a larger amount of water-soluble monomers

The amount of water-soluble monomers greater than 10% by weight in the total amount of monomers to be polymerized makes the emulsion, soap-free, and suspension polymerization systems unstable in the same way as (III), and results in poor polymerization stability. This drawback in the conventional processes has been eliminated by the process of this invention. That is, excellent polymerization stability can be maintained even though the amount of water-soluble monomers is greater than 10% by weight.

Water-soluble monomers in this invention are defined as radically polymerizable monomers having 5% by weight or more solubility in water at 25° C. Such water-soluble monomers are typified by acrylic acid, methacrylic acid, itaconic acid, hydroxyacrylate, hydroxymethacrylate, acrylonitrile, methylacrylate, acrolein, and the like.

Other features of the invention will become apparent in the course of the following description of the exemplary embodiments which are given for illustration of the invention and are not intended to be limiting thereof. In the examples below "% by weight" is described simply as "%".

EXAMPLES (1) Preparation of low molecular weight seed particles.

|  | parts by weight |
|---|---|
| Styrene | 93 |
| Methacrylic acid | 7 |
| t-Dodecylmercaptan | 10 |
| Sodium dodecylbenzene sulfonate | 0.1 |
| Potassium persulfate | 0.5 |
| Water | 250 |

The above raw materials were placed in an autoclave and polymerized in an nitrogen atmosphere at 80° C. for 15 hours with stirring, thus producing low molecular weight seed polymer particles (A) having an average diameter of 0.10 μm at a polymerization yield of 98%. The toluene soluble components of the seed particles were found to be 99% and the molecular weights (as converted to styrene) measured by GPC were:

Weight average molecular weight (Mw)=5,500
Number average molecular weight (Nm)=3,700.

Seed particles (B), (C), (D) and (E) were prepared in the same manner as seed particles (A), except that the respective amounts of t-dodecylmercaptan for seed particles (B), (C), (D) and (E) were 1, 5, 25, and 100 parts by weight. Particle sizes, weight average molecular weights, and toluene gel contents for these low molecular weight seed particles are shown in Table 1.

TABLE 1

|  | Seed Particles | | | | |
|---|---|---|---|---|---|
|  | A | B | C | D | E |
| Average particle size (μm) | 0.10 | 0.17 | 0.12 | 0.11 | 0.12 |
| Weight average molecular weight (Mw) | 5,500 | 19,500 | 9,000 | 1,200 | 340 |
| Toluene gel content (%) | 1 | 2 | 0 | 0 | 0 |

(2) Seed polymerization using low molecular weight seed particles

EXAMPLE 1

|  | parts by weight |
|---|---|
| Seed particles (A) (Solid component base) | 10 |
| Sodium dodecylbenzenesulfonate | 0.7 |
| Potassium persulfate | 0.3 |
| Water | 300 |

The above components were placed in a 10 liter autoclave. In a nitrogen atmosphere the mixture was stirred and heated to 75° C., at which temperature a mixture of the following monomers was slowly added at a constant rate over 6 hours.

|  | parts by weight |
|---|---|
| Styrene | 80 |
| Butadiene | 20 |

Polymerization conversion rates, measured at points when half of the monomers were added and when the whole monomers were added, were 87% and 92%, respectively.

After the addition of all the monomers, the resultant reaction mixture was kept at 75° C. for a further 3 hours, thus completing the polymerization with excellent polymerization stability. The ultimate polymerization conversion rate was 99%. The polymer latex produced was filtered through a 300 mesh metal sieve. It was found that the amount of agglomerated components remaining unfiltered was less than 0.001% of the total latex solid components.

Examples 2, 3; Comparative Examples 1-3

Five (5) polymer latexes were prepared in the same manner as in Example 1, except that seed particles (B)-(E) and a commercially available polymer latex (Butadiene copolymer latex #0541, manufactured by Japan Synthetic Co., Ltd., average particle size: 0.18 μm, Mw: 540,000, toluene gel content: 70%) were used instead of seed particles (A). Polymerization conversion rates, average particle diameter, and the amounts of agglomerated components are given in Table 2.

COMPARATIVE EXAMPLE 5

Batch polymerization was carried out by using the following materials.

|  | parts by weight |
| --- | --- |
| Seed particles (A) (Converted to solid components) | 10 |
| Sodium dodecylbenzenesulfonate | 0.7 |
| Potassium persulfate | 0.3 |
| Water | 300 |
| Styrene | 80 |
| Butadiene | 20 |

The above components were placed in a 10 liter autoclave. Under nitrogen atmosphere the mixture was

TABLE 2

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Presence or absence of seed particles | Present | Present | Present | Present | Present | Present | Absent | Present | Absent |
| Addition of monomers | Continuous | Continuous | Continuous | Continuous | Continuous | Continuous | Continuous | One-time | One-time |
| Types of seed particles | (A) | (C) | (D) | #0541 | (B) | (E) | — | (A) | — |
| Molecular weight of seed particles (Mw) | 5,500 | 9,000 | 1,200 | 540,000 | 19,500 | 340 | — | 5,500 | — |
| Polymerization conversion rate (%) | 99 | 98 | 99 | 99 | 98 | 99 | 99 | 98 | 99 |
| Average particle diameter (μm) | 0.22 | 0.26 | 0.24 | 0.40 | 0.37 | 0.27 | 0.50 | 0.22 | 0.34 |
| Agglomerated components (%) | below 0.001 | below 0.001 | below 0.001 | 0.21 | 0.10 | 0.15 | 1.21 | 0.31 | 2.25 |

The product of Comparative Example 1, in which a commercially available polymer latex having a molecular weight outside the scope of the present invention was used as seed particles, exhibited rather poor polymerization stability and produced a large amount of agglomerated components, although polymerization using the latex was found to be possible.

Products of Comparative Examples 2 and 3 in which seed particles having, respectively, molecular weights smaller than the lower and larger than the upper limits defined in this invention exhibited insufficient polymerization stability, thus producing a large amount of agglomerated components.

In contrast, in Examples 2 and 3, polymerization stability was excellent with the least formation of agglomerated components.

COMPARATIVE EXAMPLE 4

A polymer latex was prepared in the same manner as in Example 1, except that no seed particles were used. In this example, particle size control was difficult because of the absence of seed particles, thus resulting in large size particles. In addition, polymerization stability was poor.

stirred for 2 hours at 30° C. to effect sufficient absorption of monomers in the seed particles. The mixture was heated to 75° C. to initiate polymerization. The polymerization was carried out for 12 hours at this condition. The results are shown in Table 2.

Polymerization was found to be possible, although polymerization stability was poor and a large amount of agglomerated components was produced.

COMPARATIVE EXAMPLE 6

Batch polymerization was carried out in the same manner as in Comparative Example 1, except that no seed particles were used. In this example, polymerization stability was poor and a large amount of agglomerated components was produced.

(3) Polymerization in the system containing a smaller amount of surfactant

EXAMPLES 4-6; COMPARATIVE EXAMPLES 7-12

Products of Examples 4-6 and Comparative Examples 7-12 were prepared in the same manner as in Examples 1-3 and Comparative Example 1-6, respectively, at a low surfactant concentration, i.e. by using 0.08 parts by weight of sodium dodecylbenzenesulfonate instead of 0.7 parts by weight. The results are given in Table 3.

TABLE 3

|  | Example | | | Comparative Example | | | | | |
| --- | --- | --- | --- | --- | --- | --- | --- | --- | --- |
|  | 4 | 5 | 6 | 7 | 8 | 9 | 10 | 11 | 12 |
| Presence or absence of seed particles | Present | Present | Present | Present | Present | Present | Absent | Present | Absent |
| Addition of monomers | Continuous | Continuous | Continuous | Continuous | Continuous | Continuous | Continuous | One-time | One-time |
| Types of seed particles | (C) | (A) | (D) | #0541 | (B) | (E) | — | (A) | — |
| Molecular weight of seed particles (Mw) | 9,000 | 5,500 | 1,200 | 540,000 | 19,500 | 340 | — | 5,500 | — |
| Polymerization | 99 | 97 | 99 | gelled | 98 | gelled | gelled | 98 | gelled |

TABLE 3-continued

| | Example | | | Comparative Example | | | | | |
|---|---|---|---|---|---|---|---|---|---|
| | 4 | 5 | 6 | 7 | 8 | 9 | 10 | 11 | 12 |
| conversion rate (%) | | | | | | | | | |
| Average particle diameter (μm) | 0.27 | 0.22 | 0.25 | — | 0.38 | — | — | 0.22 | — |
| Agglomerated components (%) | 0.021 | 0.002 | 0.003 | — | 3.90 | — | — | 2.31 | — |

Sodium dodecylbenzenesulfonate was used in these examples at the 63% critical micelle concentration (CMC) at 60° C., since the CMC of this surfactant is 0.042%..

In Comparative Example 7, commercially available seed particles having an average molecular weight outside the defined range of this invention were used. In Comparative Example 9, seed particles having an aver-

| | parts by weight |
|---|---|
| Styrene | 55 |
| Butadiene | 40 |
| Methacrylic acid | 5 |

The results are shown in Table 4.

TABLE 4

| | Example | | | Comparative Example | | | | | |
|---|---|---|---|---|---|---|---|---|---|
| | 7 | 8 | 9 | 13 | 14 | 15 | 16 | 17 | 18 |
| Presence or absence of seed particles | Present | Present | Present | Present | Present | Present | Absent | Present | Absent |
| Addition of monomers | Continuous | Continuous | Continuous | Continuous | Continuous | Continuous | Continuous | One-time | One-time |
| Types of seed particles | (C) | (A) | (D) | #0541 | (B) | (E) | — | (A) | — |
| Molecular weight of seed particles (Mw) | 9,000 | 5,500 | 1,200 | 540,000 | 19,500 | 340 | — | 5,500 | — |
| Polymerization conversion rate (%) | 99 | 99 | 98 | gelled | gelled | gelled | gelled | 99 | gelled |
| Average particle diameter (μm) | 0.27 | 0.23 | 0.25 | — | — | — | — | 0.22 | — |
| Agglomerated components (%) | 0.12 | 0.005 | 0.21 | — | — | — | — | 5.20 | — |
| Agglomerated component concentration after polymerization (%) | 56.9 | 57.0 | 56.9 | — | — | — | — | 56.90 | — | age molecular weight outside the defined range were used. In Comparative Example 10 monomers were continuously added to the reaction system without using seed particles. In Comparative Example 12, monomers were added at one time to the reaction system without using seed particles. All these Comparative Examples exhibited insufficient polymerization stability and the reaction mixtures were gelled in the course of the polymerization.

In Comparative Example 8, seed particles used were greater than the defined range. In Comparative Example 11, monomers were added to the reaction system at one time. In these Comparative Examples large amounts of agglomerated components were produced and polymerization stability was very poor, even though the polymerization reaction was completed.

As opposed to these Comparative Examples, Examples 4-6 exhibited very good polymerization stability, producing formation of the least amounts of agglomerated components.

(4) Polymerization at higher solid component concentration

Examples 7-9; Comparative Examples 13-18

Polymerization reactions of Examples 7-9 and Comparative Examples 13-18 were carried out in the same manner as in Examples 1-3 and Comparative Examples 1-6, respectively, by using raw material compositions with higher solid component concentrations, i.e., by using 2 parts by weight of sodium dodecylbenzenesulfonate and 85 parts by weight of water, and by using a monomer of the following composition.

In Comparative Example 13, commercially available seed particles having an excessively high molecular weight were used. In Comparative Example 14 seed particles having a molecular weight exceeding the defined range were used. In Comparative Example 15, seed particles having molecular weight smaller than the defined range were used. In Comparative Example 16, monomers were continuously added to the reaction system without using seed particles. In Comparative Example 18, monomers were added at one time to the reaction system without using seed particles. In all of these Comparative Examples, the reaction mixtures were gelatinized in the course of the polymerization making further proceeding of the polymerization reaction impossible.

In Comparative Example 17, monomers were added to the reaction system at one time. In this Comparative Example, large amounts of agglomerated components were produced and polymerization stability was very poor, even though the polymerization reaction was completed.

As opposed to these Comparative Examples, Examples 7-9 exhibited very good polymerization stability, giving formation of the least amounts of agglomerated components. Polymer latexes produced by these examples had high solid component concentrations of greater than 55%. Polymerization using large amounts of crosslinked monomers Examples 10-12; Comparative Examples 19-24

Polymerization reactions of Examples 10-12 and Comparative Examples 19-24 were carried out in the same manner as in Examples 1-3 and Comparative Examples 1-6, respectively, by using raw material compositions containing 15 parts by weight of a crosslinking monomer, divinylbenzene, i.e., by using a monomer mixture of the following composition.

|  | parts by weight |
|---|---|
| Styrene | 85 |
| Divinylbenzene (Converted to effective component) | 15 |

Examples 13-15; Comparative Examples 25-30

Polymerization reactions using monomers containing 55% of a crosslinking monomer (Examples 13-15 and Comparative Examples 25-30) were carried out in the same manner as in Examples 10-12 and Comparative Examples 19-24, respectively, by using, as a raw material, 100 parts by weight of a commercially available divinylbenzene (containing 55% of the effective component, with the remaining portion being ethylvinylbenzene).

The results are shown in Table 6.

TABLE 6

|  | Example | | | Comparative Example | | | | | |
|---|---|---|---|---|---|---|---|---|---|
|  | 13 | 14 | 15 | 25 | 26 | 27 | 28 | 29 | 30 |
| Presence or absence of seed particles | Present | Present | Present | Present | Present | Present | Absent | Present | Absent |
| Addition of monomers | Continuous | Continuous | Continuous | Continuous | Continuous | Continuous | Continuous | One-time | One-time |
| Types of seed particles | (C) | (A) | (D) | #0541 | (B) | (E) | — | (A) | — |
| Molecular weight of seed particles (Mw) | 9,000 | 5,500 | 1,200 | 540,000 | 19,500 | 340 | — | 5,500 | — |
| Polymerization conversion rate (%) | 99 | 100 | 99 | gelled | gelled | gelled | gelled | gelled | gelled |
| Average particle diameter (μm) | 0.25 | 0.23 | 0.22 | — | — | — | — | — | — |
| Agglomerated components (%) | 0.11 | 0.25 | 0.15 | — | — | — | — | — | — |

The results are shown in Table 5.

TABLE 5

|  | Example | | | Comparative Example | | | | | |
|---|---|---|---|---|---|---|---|---|---|
|  | 10 | 11 | 12 | 19 | 20 | 21 | 22 | 23 | 24 |
| Presence or absence of seed particles | Present | Present | Present | Present | Present | Present | Absent | Present | Absent |
| Addition of monomers | Continuous | Continuous | Continuous | Continuous | Continuous | Continuous | Continuous | One-time | One-time |
| Types of seed particles | (C) | (A) | (D) | #0541 | (B) | (E) | — | (A) | — |
| Molecular weight of seed particles (Mw) | 9,000 | 5,500 | 1,200 | 540,000 | 19,500 | 340 | — | 5,500 | — |
| Polymerization conversion rate (%) | 100 | 99 | 100 | gelled | gelled | gelled | gelled | 99 | gelled |
| Average particle diameter (μm) | 0.26 | 0.23 | 0.23 | — | — | — | — | 0.42 | — |
| Agglomerated components (%) | 0.102 | 0.012 | 0.087 | — | — | — | — | 7.40 | — |

In Comparative Example 19, commercially available seed particles having a very high molecular weight were used. In Comparative Example 20, seed particles having a molecular weight exceeding the defined range were used. In Comparative Example 21, seed particles having a molecular weight smaller than the defined range were used in an amount smaller than the defined range. In Comparative Example 22, monomers were continuously added to the reaction system without using seed particles. In Comparative Example 24, monomers were added at one time to the reaction system without using seed particles. In all of these Comparative Examples, the reaction mixtures were gelled in the initial stage of the polymerization making further proceeding of the polymerization reaction impossible.

In Comparative Example 23, monomers were added to the reaction system at one time. In this Comparative Example, large amounts of agglomerated components were produced, even though the polymerization reaction was completed.

In contrast, Examples 10-12 exhibited very good polymerization stability, producing formation of the least amounts of agglomerated components.

In Comparative Example 25, commercially available seed particles having a very high molecular weight were used. In Comparative Example 26, seed particles having a molecular weight exceeding the defined range were used. In Comparative Example 27, seed particles having a molecular weight smaller than the defined range were used. In Comparative Example 28, monomers were continuously added to the reaction system without using any seed particles. In Comparative Example 29, all monomers were added at one time to the reaction system. Comparative Example 30 represents the example in which all monomers were added at one time to the reaction system without using any seed particles. In all of these Comparative Examples the reaction mixtures were gelled at the initial stage of the polymerization making further proceeding of the polymerization reaction impossible.

In contrast, Examples 13-15 exhibited very good polymerization stability, producing formation of the least amounts of agglomerated components.

(6) Examples using a large proportion of water-soluble monomers

Examples 16–18; Comparative Examples 31–36

Polymerization reactions using a monomer mixture with a higher content of water-soluble monomers were carried out as Examples 16–18 and Comparative Examples 31–36. In these examples, the reactions were carried out in the same manner as in Examples 1–3 and Comparative Examples 1–6, respectively, by using a monomer mixture of the following composition.

|  | parts by weight |
|---|---|
| Styrene | 65 |
| Hydroxyethylacrylate | 10 |
| Methacrylic acid | 5 |
| Acrylonitrile | 20 |

The results are shown in Table 7.

TABLE 7

|  | Example | | | Comparative Example | | | | | |
|---|---|---|---|---|---|---|---|---|---|
|  | 16 | 17 | 18 | 31 | 32 | 33 | 34 | 35 | 36 |
| Presence or absence of seed particles | Present | Present | Present | Present | Present | Present | Absent | Present | Absent |
| Addition of monomers | Continuous | Continuous | Continuous | Continuous | Continuous | Continuous | Continuous | One-time | One-time |
| Types of seed particles | (C) | (A) | (D) | #0541 | (B) | (E) | — | (A) | — |
| Molecular weight of seed particles (Mw) | 9,000 | 5,500 | 1,200 | 540,000 | 19,500 | 340 | — | 5,500 | — |
| Polymerization conversion rate (%) | 99 | 99 | 100 | gelled | 98 | gelled | gelled | 99 | gelled |
| Average particle diameter (μm) | 0.23 | 0.22 | 0.21 | — | 0.35 | — | — | 0.20 | — |
| Agglomerated components (%) | 0.18 | 0.04 | 0.12 | — | 7.9 | — | — | 5.6 | — |

In Comparative Example 31, commercially available seed particles having a very high molecular weight were used. In Comparative Example 32, seed particles having a molecular weight exceeding the defined range were used. In Comparative Example 33, seed particles having a molecular weight smaller than the defined range were used. In Comparative Example 34, monomers were continuously added to the reaction system without using seed particles. Comparative Example 30 represents the example in which all monomers were added at one time to the reaction system without using seed particles. In all of these Comparative Examples, the reaction mixtures were gelled at the initial stage of the polymerization making further proceeding of the polymerization reaction impossible.

In Comparative Example 35, all monomers were added at one time to the reaction system. In this example, a large amount of agglomerated components was produced, even though the polymerization was completed.

In contrast, Examples 16–18 exhibited very good polymerization stability, producing formation of the least amounts of agglomerated components.

|  | parts by weight |
|---|---|
| Styrene | 98 |
| Methacrylic acid | 2 |
| t-Dodecylmercaptan | 10 |
| Sodium dodecylbenzene sulfonate | 0.05 |
| Potassium persulfate | 1.0 |
| Water | 200 |

The above raw materials were placed in a 2 liter autoclave and polymerized in an nitrogen atmosphere at 70° C. for 6 hours while stirring, thus producing seed polymer particles (1) having an average particle diameter of 0.50 μm, with a standard deviation of 0.015 μm, at a polymerization yield of 98%. The average particle diameter was determined by averaging the measurements on 100 particles by transmission electron microscopy photography. The toluene soluble components of the seed particles were found to be 98% and the molecular weights measured by GPC were:

Weight average molecular weight (Mw)=5,500
Number average molecular weight (Mn)=3,100.

Seed polymer particles (2) and (3) were prepared in the same manner and by using the same raw materials as seed polymer particles (1), except that the amounts of sodium dodecylbenzene sulfonate were 0.01 parts by weight for seed polymer particles (2) and 0.2 parts by weight for seed polymer particles (3). The average particle diameters of seed polymer particles (2) and (3) were 1.1 μm and 0.12 μm, respectively.

|  | parts by weight |
|---|---|
| Seed particles (Solid component base) | 8 |
| Sodium laurylsulfonate | 0.2 |
| Potassium persulfate | 0.5 |
| Water | 500 |

The above components were mixed under a nitrogen stream and heated to 80° C., at which temperature a commercially available divinylbenzene having the following composition was dropwise added over 4 hours, thus effecting polymerization.

|  | % by weight |
|---|---|
| Divinylbenzene | 55 |
| Ethylvinylbenzene | 42 |
| Saturated hydrocarbons | 3 |

After the addition, the polymerization was continued at 80° C. for a further 2 hours, thus obtaining a latex of crosslinked polymer particles (a) at a polymerization yield of 92%. The polymer latex produced was filtered through a 300 mesh metal sieve. The amount of agglomerated components remaining unfiltered through a 200 mesh sieve was 0.02% of the total polymerized solid components. The volume average particle size of the particles (a) determined by averaging electron microscope photography measurements on 200 particles selected at random was 1.0 μm, with 92% by weight of the total particles measured falling within the range 0.7-1.3 μm. These particles were almost completely spherical.

In the same manner as the above, crosslinked polymer particles (b) and (c) were prepared from seed polymer particles (2) and (3).

Crosslinked polymer particles (d) and (e) were prepared in the same manner as crosslinked polymer particles (a), except that, instead of 100 parts by weight of the commercially available divinylbenzene, 55 parts by weight of the commercially available divinylbenzene and 45 parts by weight of styrene (corresponds to 30 parts by weight of pure divinylbenzene) were used for crosslinked polymer particles (d) and 18 parts by weight of the commercially available divinylbenzene and 82 parts by weight of styrene (corresponds to 10 parts by weight of pure divinylbenzene) were used for crosslinked polymer particles (e). Table 8 shows the data for crosslinked polymer particles (a)-(e).

TABLE 8

|  | Crosslinked polymer particles | | | | |
|---|---|---|---|---|---|
|  | a | b | c | d | e |
| Volume average particle size $D_v$ (μm) | 1.0 | 2.3 | 0.25 | 1.0 | 1.0 |
| Particles having particle size falling within $D_v \times 0.7$–$D_v \times 1.3$ (wt %) | 92 | 90 | 95 | 90 | 89 |
| Particle shape | (Almost complete sphere) | | | | |
| Amount of polyfunctional vinyl monomers in the monomers (wt %) | 55 | 55 | 55 | 30 | 10 |

Application Example 1

Into an autoclave 1,000 g of ε-caprolactam was charged and made molten by heating at 120° C. To this was slowly added the latex of crosslinked polymer particles (a), 10 g as a solid base, while stirring. After evaporating the water, the resulting mixture was cooled. A portion of the product was sampled and observed to confirm that the crosslinked polymer particles (a) were homogeneously dispersed.

To the dispersion were added 12 of adipic acid and 10 g of water. After sealing the autoclave, the mixture was reacted at 250° C. for 3 hours. The pressure was gradually released down to 3 mmHg, at which pressure the mixture was kept at 250° C. for 1 hour to obtain nylon 6 in which the crosslinked polymer particles (a) were homogeneously dispersed.

The melt spinning was carried out on this polymer product using a pressure-melter-type spinning machine through nozzles with 100 openings at 350° C., at a spinning rate of 500 m/min. After spinning, the fiber was stretched to a length of 100 times, thus producing a particle composite fiber.

The spinning and stretching operations were carried out in good conditions without fiber cutting and nozzle clogging. The fibers produced were anisotropic and had diameters of about 10 μm. Bulges, where crosslinked particles are enclosed, were seen here and there in fibers. The anisotropy index of the fiber X, determined by the equation, $X = D_b/D$, wherein D is the average diameter of the fiber and $D_b$ is the average diameter of the bulges, was 1.87.

The interfaces of the fiber and the particles were investigated on cut samples by transmission electron microscope to confirm that there were no vacant spaces due to interface strips. The fiber was wound around a winding machine to measure the running resistance at the portion at which the fiber contacts stainless steel. The resistance of the fiber was ¼ as small as that of a comparative fiber sample in which no particles were incorporated.

Cloth was woven from the fiber, which had a special gloss and produced an excellent sense of sophistication.

Comparative Application Example 1

A silica particle composite fiber was prepared in the same manner as in Application Example 1, except that silica particles, commercially sold for resin addition (air classified, having an average volume particle size of 1.2 μm, and of which 70% of the particles had particle sizes falling within ±30% of the average volume particle size), were used instead of the crosslinked polymer particles.

When spun, the fibers were cut very frequently due to the large silica particles included therein. The fiber had a diameter of 15 μm and a smaller anisotopy index (X) of 1.21. Strips were observed by transmission electron microscope in the interface of fiber polymer and particles.

Application Examples 2-5

Particle composite fibers of Application Examples 2-5 were prepared in the same manner as in Application Example 1, except that crosslinking polymer particles (B), (C), (D), instead of the crosslinked polymer particles (A).

Application Examples 2 and 3 used particles having different sizes and Application Examples 4 and 5 are examples using crosslinking polymer particles containing a smaller amount of polyfunctional vinylmonomer.

The results are shown in Table 9, in which the data for nylon 6 containing no particles are also given as Comparative Application Example 2.

TABLE 9

|  | Application Example | | | | | Comparative Application Example | |
|---|---|---|---|---|---|---|---|
|  | 1 | 2 | 3 | 4 | 5 | 1 | 2 |
| Fiber polymer. | Nylon 6 | Nylon 6 | Nylon 6 | Nylon 6 | Nylon 6 | Nylon 6 | Nylon 6 |
| Crosslinked particles | a | b | c | d | e | Silica | — |
| Concentration of particles (wt %) | 1 | 1 | 1 | 1 | 1 | 1 | 0 |
| Streisand magnification | 100 | 100 | 100 | 100 | 100 | 100 | 100 |
| Fiber diameter (μm) | 10 | 12 | 8 | 10 | 11 | 15 | 10 |
| Anisotropy index (X) | 1.87 | 2.1 | 1.56 | 1.72 | 1.65 | 1.12 | 1.0 |

TABLE 9-continued

| | Application Example | | | | | Comparative Application Example | |
| --- | --- | --- | --- | --- | --- | --- | --- |
| | 1 | 2 | 3 | 4 | 5 | 1 | 2 |
| Interface strips due to particles | Nil | Nil | Nil | Nil | Nil | Strips existed | Nil |
| Concave-convex in the fiber surface | small | large | medium | large | large | large | small |

As fully illustrated above, the seed polymerization process of the present invention provides far more excellent polymerization stability than do conventional seed polymerization processes. Polymer emulsions containing less amounts of agglomerated components can be prepared by the present seed polymerization process. Advantages of the process are not only in improved emulsion quality, but also in process operation, e.g. decreased dirt in the polymerization reaction vessels, and in the productivity, e.g. better filtration performance.

Furthermore, the process of the present invention has ensured the polymerization in the systems in which the polymerization reactions have not proceeded by using conventional seed polymerization processes, e.g. the systems using a small amount of stabilizers, having a high solid component concentration, using a large amount of crosslinking monomers, or containing a larger amount of water-soluble monomers. Thus, the process of the present invention has enlarged the applicability of emulsion polymerization and soap-free polymerization in an aqueous phase.

Obviously, numerous modifications and variations of the present invention are possible in light of the above teachings. It is therefore to be understood that within the scope of the appended claims, the invention may be practiced otherwise than as specifically described herein.

What is claimed is:

1. A process for preparing polymer particles from polymerizable monomers which are ethylenically unsaturated by seed polymerization in the presence of a polymer emulsion comprising water-insoluble low molecular weight polymer particles, in an amount of 0.5-30 parts by weight per 100 parts by weight of said polymerizable monomers, having a weight average molecular weight of 500-10,000 which are prepared by emulsion polymerization or soap-free polymerization of monomers radically polymerizable to an aqueous system in the presence of a molecular weight modifier, wherein said seed polymerization of polymerizable monomers is carried out (i) by initially not charging or charging less than 30% by weight of said polymerizable monomers to the polymerization mixture and (ii) after polymerization conditions are established, by continuously or intermittently adding the remaining portion of said polymerizable monomers to the reaction system.

2. The process according to claim 1, wherein said seed polymerization is carried out at a concentration in water of a surfactant below the critical micelle concentration.

3. The process according to claim 1, wherein the solid concentration of the polymerized product by the seed polymerization is 55% by weight or more.

4. The process according to claim 1, wherein said polymerizable monomers comprise 10% by weight or more of crosslinking monomers.

5. The process according to claim 1, wherein said polymerizable monomers comprise 10% by weight or more of water-soluble monomers.

6. Polymer particles prepared by the process according to claim 1.

7. Polymer particle-containing fiber comprising 0.01-5 parts by weight of polymer particles prepared by the process according to claim 1 per 100 parts by weight of fiber polymers.

8. A polymer particle-containing fiber comprising 0.01-5 parts by weight of polymer particles per 100 parts by weight of fiber polymers, wherein:

the polymer particles are prepared from polymerizable monomers which are ethylenically unsaturated by seed polymerization in the presence of a polymer emulsion comprising water-insoluble low molecular weight polymer particles, in an amount of 0.5-30 parts by weight per 100 parts by weight of said polymerizable monomers, having a weight average molecular weight of 500-10,000 which are prepared by emulsion polymerization or soap-free polymerization of monomers radically polymerizable in an aqueous system in the presence of a molecular weight modifier, wherein said seed polymerization of polymerizable monomers is carried out (i) by initially not charging or charging less than 30% by weight of said polymerizable monomers to the polymerization mixture and (ii) after polymerization conditions are established, by continuously or intermittently adding the remaining portion of said polymerizable monomers to the reaction system; and wherein said polymer particles are crosslinked polymer particles which:

(a) are produced by the emulsion polymerization of radially polymerizable monomers containing at least 5% by weight of cross-linking vinyl monomers, (b) have a volume average particle size of 0.1-3 $\mu$m, and (c) 80% by weight or more of the particles of which the particle size falls within 30% of the volume average particle size.

9. Polymer particle-containing fiber according to claim 8, wherein said crosslinked polymer particles are porous particles.

* * * * *